Dec. 3, 1968   J. C. FRASER   3,414,813
CORONA POWER MEASUREMENT DEVICE
Filed Aug. 27, 1965

Inventor:
James C. Fraser,
by Paul A. Frank
His Attorney.

United States Patent Office 3,414,813
Patented Dec. 3, 1968

3,414,813
CORONA POWER MEASUREMENT DEVICE
James C. Fraser, Schenectady, N.Y., assignor to General Electric Company, a corporation of New York
Filed Aug. 27, 1965, Ser. No. 483,162
3 Claims. (Cl. 324—72)

ABSTRACT OF THE DISCLOSURE

A device for measuring power consumption in a corona-type silent electrical discharge device comprising a voltage branch including a high and a low voltage capacitor and a parallel charge branch including the discharge device and a low voltage capacitor, each branch being connected across a high voltage, high frequency A-C source. Upon adjustment of a charge branch shunt resistor to a zeroing point, a voltage coil and a charge coil respectively shunting the low voltage capacitors rotate with respect to one another in a meter arrangement to indicate corona discharge power.

---

My invention relates to a circuit for measuring the power consumed in a silent electrical discharge, and more particularly a corona discharge.

When opposed electrodes separated by a gaseous media are connected to the opposite terminals of a source of alternating current, the gaseous media and electrodes function together as a capacitor, the gaseous media serving as the insulator and the electrodes as the plates of the capacitor.

In certain instances, it may be desirable to increase the voltage between the electrodes sufficiently to partially break down the insulative properties of the gaseous media, that is, to generate a silent electrical discharge. In such circumstance, the electrodes and gaseous media cease to function merely as a capacitor but form the circuit equivalent of a capacitor and resistance connected in parallel. This is because a portion of the electrical power supplied to the electrodes is consumed in propagating the silent discharge.

It is an object of my invention to provide an arrangement to directly and accurately indicate the power consumed in propagating a silent electrical or corona-type discharge.

My invention includes a branched electrical circuit connected to a source of alternating current. In a first or voltage branch of the circuit at least two capacitors are connected in series. In a second or charge branch of the electrical circuit, a corona discharge device is connected in series with a third capacitor. The terminals of one capacitor in each branch are shunted by a coil connected in series to current rectifying means. The capacitor in the charge branch is additionally shunted by a variable resistance. The coils in the charge and voltage branches may be physically arranged for relative movement to provide a direct, numerical indication of power consumed in the discharge device.

Figure 1:
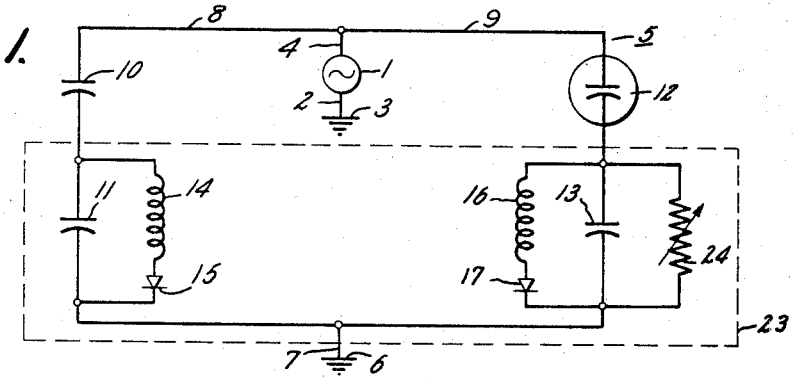
Figure 2:
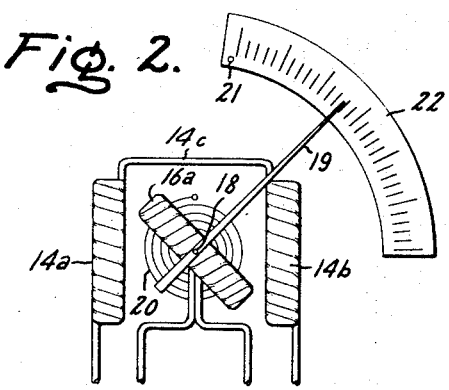
Figure 3:
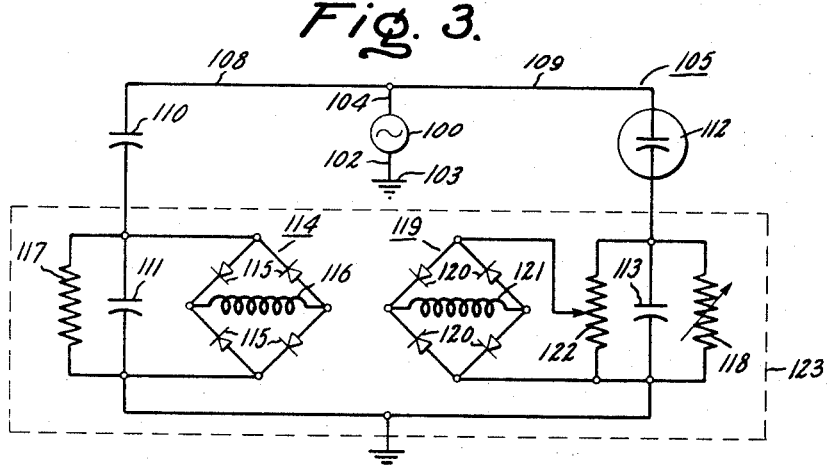

My invention may be better understood by referring to the following detailed description considered in conjunction with the drawings, in which FIGURE 1 is a circuit diagram of my apparatus,
FIGURE 2 is a plan view of a power indicating arrangement, and
FIGURE 3 is a diagram of a preferred circuit.

Noting FIGURE 1, a source of alternating current 1 is connected through terminal lead 2 to ground 3. Terminal lead 4 connects the alternating current source to a branched circuit 5 which extends to ground at 6 through lead 7. The branched circuit is comprised of a first or voltage branch 8 and a second or charge branch 9. The voltage branch includes a first capacitor 10 and a second capacitor 11 connected in series. The charge branch includes a silent electrical discharge device 12 and a third capacitor 13 connected in series. As illustrated, capacitor 11 in the voltage branch is shunted by a coil 14, hereinafter designated a voltage coil, connected in series with a rectifier 15 while capacitor 13 in the charge branch, is shunted by coil 16, hereinafter designated a charge coil, in series with rectifier 17. The capacitor 13 is additionally connected in parrallel with a variable resistor 24.

FIGURE 2 illustrates a type of arrangement which may be used in my inventive circuit to indicate power consumed. The voltage coil, schematically shown at 14 in FIGURE 1, is physically divided into coil sections 14a and 14b electrically connected through conductor 14c. Coil 16a, corresponding to charge coil 16 in FIGURE 1, is pivotally mounted on an axis 18. An indicator needle 19 is physically attached to the charge coil for rotation therewith. A coil spring 20 resiliently biases charge coil 16a in a counter-clockwise direction toward needle peg 21 on a calibrated dial 22. The dial may be calibrated directly in units of power, such as watts. The dashed line 23 in FIGURE 1 illustrates the portion of the circuitry which may be conveniently packaged into a compact meter unit.

My invention is applicable to all silent electrical discharge devices which operate at high voltages on alternating currents. Voltages of from 10 to 15 kilovolts peak are typically employed, for example, in achieving partial electrical breakdown of gaseous media at or near atmospheric pressures. While widely variable frequencies may be employed, high frequencies, typically in excess of 3000 c.p.s., are usually employed in order to accelerate the transfer of energy to the gaseous media. Power consumption of such devices is generally less than 800 watts while the capacitance of the units generally lies below 400 picofarads. Such devices are well known in the art and take varied physical forms to perform a variety of uses ranging from chemical catalysis to electrostatic charging of surfaces. My invention is particularly well suited for use with corona discharged producing devices. Such devices are, of course completely dissimilar from disruptive electrical discharge devices, which produce arcing.

The value of the capacitor 13 placed in series with the silent discharge device 12 is preferably much larger than that of the discharge device. Since capacitors in series exhibit individual voltage drops across their terminals in inverse proportion to their capacitive values, only a small potential difference may be present across the terminals of the capacitor 13 while a large potential difference remains across the discharge device 12. In view of the high voltages required in achieving silent electrical discharges, it is generally preferred that the value of capacitor 13 be related to the capacitance of discharge device 12 so that the voltage drop across the discharge device is in the order of $10^3$ to $10^4$ times greater than the voltage drop across the capacitor 13. It is appreciated, of course, that the ratio in which the voltage is divided will be influenced to some extent by the operating characteristics of the indicator chosen. Capacitors 10 and 11 also function as voltage dividers. It is generally preferred that the values of the capacitors 10 and 11 be chosen to at least roughly approximate those of device 12 and capacitor 13, respectively.

By using capacitive voltage dividers in both the charge and voltage branches of my circuit, the hazards of working with high voltage can be minimized. The discharge device 12 and the capacitor 10 can be physically located in a high voltage zone remote from operating personnel. The remainder of the circuit may be formed into a compact meter unit for convenient use in a remote, low voltage zone work area. Not only does this arrangement protect operators from high voltages, but it also allows personnel to remain in areas protected from the explosion hazards attendant to many uses of discharge devices.

In operation, using a wattmeter such as illustrated in FIGURE 2, a silent electrical discharge device 12 is connected in the electrical circuit shown in FIGURE 1. A source of high frequency, high voltage alternating current 1 is connected through terminal lead 4 to the branched circuit 5. The voltage is maintained at a level approaching but below that required to initiate an electrical discharge. At this point, the variable resistor 24 is adjusted to bring the indicator needle 19 to the desired position on the dial 22, which position is assigned a value of zero watts. Where the apparatus of my invention is intended to be used with only a single discharge device rather than to be adaptive for use with any silent discharge device, it is appreciated that through proper sizing of elements or after initial adjustment the variable resistor 24 may be omitted.

Next, the voltage supplied to the discharge device is increased sufficiently to generate a silent electrical discharge. At this point, the discharge device ceases to function electrically merely as a capacitor but functions in the circuit as would a capacitor and resistor in parallel. This change in the discharge device is reflected in an alteration of the strength of the magnetic field produced by the charge coil. This in turn causes the charge coil to rotate on pivot 18 so that indicator needle 19 designates on the dial 22 the number of watts utilized in generating the electrical discharge. While current is supplied to the coil during only one-half of each cycle, at high frequencies the inertia of the coil and indicator needle are sufficient to limit oscillations on the dial.

FIGURE 3 illustrates a preferred form of my apparatus. A source of alternating current 100 is connected through terminal lead 102 to ground 103. Terminal lead 104 connects the alternating current source to a branched circuit 105 which extends to ground at 106 through lead 107. The branched circuit is comprised of a first or voltage branch 108 and a second or charge branch 109. The voltage branch includes a first capacitor 110 and a second capacitor 111 connected in series. The charge branch includes a silent electrical discharge device 112 and a third capacitor 113 connected in series. Capacitor 111 is shunted by a bridge 114 formed of four rectifiers 115 and a coil 116. The capacitor is also connected in parallel with a large resistance 117. The capacitor 113 is shunted by a variable resistor 118 and by a resistive potential divider 122. A bridge 119 is connected to ground and to the variable potential terminal of the potential divider 122. The bridge 119 is formed of four rectifiers 120 and a coil 121. The dashed line 123 indicates the portion of the circuit which may be conveniently formed into a compact physical unit. The circuit shown in FIGURE 3 may utilize the type of meter arrangement shown in FIGURE 2. In such case, the coil 116 would correspond to coil segments 14a and 14b while coil 121 would correspond to coil 16a.

In operation of the assembly shown in FIGURE 3, the discharge device 112 is provided with a voltage just below that required to initiate a silent discharge. The variable resistor 118 is then adjusted to bring the indicator needle 19 to a zero position on the dial. It may be necessary to also move the variable voltage terminal of the resistive potential divider 122 in order to reach a zero position. The voltage supplied to the discharge device is then increased to produce a non-disruptive electrical discharge. This alters the magnetic flux of the coil 121 and causes an indicator needle deflection indicative of the power consumed in propagating the discharge. It is noted that the rectifier bridges supply a continuous, unidirectional current flow through the coils so that stability of the indicator needle is essentially independent of circuit frequencies. This allows the circuit of FIGURE 3 to be used at or below power frequencies. As a safety feature, the circuit additionally includes a resistor 117 to bleed off any excess charge of electricity which may accumulate across capacitor 111 as might occur, for example, if capacitor 110 were to fail in use.

While my invention is disclosed and described with reference to certain preferred embodiments, numerous variations will, of course, be obvious to those skilled in the art. For example, certain conventional circuit elements usually employed in combination with silent electrical discharge devices, such as voltage regulation means, tuning circuit, etc., which would lie in series relation with the branched circuit, have been omitted in the interest of clarity and simplicity. It is accordingly intended that the scope of my invention be determined by reference to the following claims.

What I claim as new and desire to secure by Letters Patent of the United States is:

1. A device for measuring corona discharge power comprising the combination of
   a source of high voltage, high frequency A-C potential,
   a first circuit branch coupled across said source comprising a voltage divider circuit including a high voltage capacitor and a first low voltage capacitor connected in series circuit relationship, and a coil connected in parallel circuit relationship with said first low voltage capacitor having a current and magnetic field proportional to the voltage thereacross,
   a second circuit branch coupled across said source comprising a voltage divider circuit including a capacitive corona discharge device and a second low voltage capacitor connected in series circuit relationship, and a coil connected in parallel circuit relationship with said second low voltage capacitor having a current and magnetic field proportional to the charge when a high voltage in the range of 10 to 15 kilovolts is applied to said corona discharge device and a corona discharge is generated,
   wherein the capacitance values of the high voltage capacitor and corona discharge device are substantially fixed and are of roughly the same magnitude, and the capacitance values of the low voltage capacitors are also substantially fixed and roughly of the same magnitude, and
   means for mounting said coils to indicate the power consumed in the corona discharge.

2. A device as defined in claim 1 further including solid state full wave rectifying means interconnected with each of said coils, and
   a variable resistor connected in parallel circuit relationship with said second low voltage capacitor to adjust said coils to a predetermined zero point when the source voltage approaches but is below that needed to initiate corona discharge.

3. A device as defined in claim 2 further including means for housing said low voltage capacitors, coils and rectifying means, and adjustable resistor, as a meter unit, whereby the low voltage meter unit can be located remote from the high voltage capacitor and corona discharge device.

References Cited

UNITED STATES PATENTS

| | | | |
|---|---|---|---|
| 2,558,945 | 7/1951 | Fritzinger | 324—140 XR |
| 2,648,048 | 8/1953 | Vackar | 324—142 XR |
| 3,304,498 | 2/1957 | Myers | 324—122 XR |

RUDOLPH V. ROLINEC, *Primary Examiner.*

E. L. STOLARUN, *Assistant Examiner.*